Patented May 13, 1930

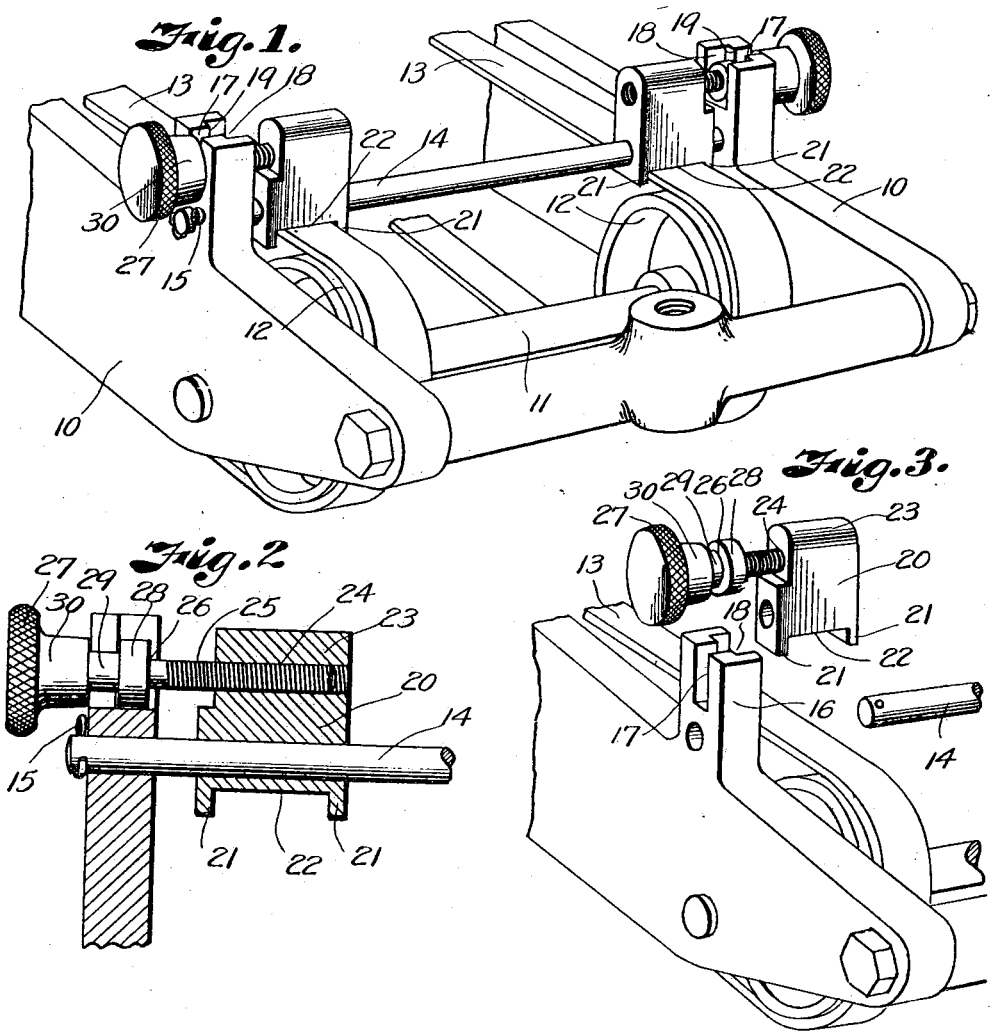

1,758,246

UNITED STATES PATENT OFFICE

EDWARD M. BRACKETT AND FRED M. BRACKETT, OF TOPEKA, KANSAS

BELT GUIDE

Application filed June 21, 1926. Serial No. 117,626.

Our invention relates to belt guides and more particularly to a belt guide for conveyor belts on stripping machines.

In a stripping machine leather belts are used for conveying the sheets to which the strips are to be applied. As the character of the leather in the belts is not uniform, the tendency of the belts very frequently is to run more to one side of the pulleys over which the same pass than the other. After the belts leave the pulleys the belts tend to resume their natural course and as a result do not run in parallelism, but either move toward or away from each other as they travel along.

It is a purpose of our invention to provide means to compensate for this tendency, said means comprising guiding means and means whereby said guiding means can be adjusted relative to the belt pulleys. This is accomplished by adjusting the belt guides to crowd over the belts transversely of the pulleys in a direction opposite that in which it is desired to adjust the belts after passing over the pulleys, in order that the same travel in parallelism. That is, for example, if the belt moves to the left after passing over the pulley due to a tendency of the belt to run on the right side of the pulley, the guide for the belt adjacent the pulley is adjusted toward the left to crowd the belt toward the left at the pulley and cause it to travel more to the right after it has passed over the pulley, thus compensating for the tendency of the belt to run toward the left after leaving the pulley, and causing the same to run straight. The belt guides are adjacent the sides of the pulleys at which the belts run onto the pulleys to accomplish this purpose.

Other objects and advantages of the invention will appear as the description of the accompanying drawings proceeds. However, we desire to have it distinctly understood that we do not intend to limit ourselves to the exact details shown or described, but that we intend to include as part of our invention all such obvious changes and modifications of parts as would occur to a person skilled in this art and as would fall within the scope of the claims.

In the drawings:

Fig. 1 is a fragmentary perspective view of a portion of a machine framework, showing our improved belt guide in position thereon.

Fig. 2 is a fragmentary, vertical, sectional view of our improved belt guide and the mounting means therefor.

Fig. 3 is a perspective view of the belt guide and portions of the mounting therefor, showing the same, separated.

Fig. 4 is a perspective view of the adjusting means, and

Fig. 5 is a perspective view of the guide member employed.

Referring in detail to the drawings:

Our improved belt guide is shown as being employed upon a machine having the side frame members 10 within which the transversely extending shaft 11 is journalled, said shaft having the belt pulleys 12 mounted thereon over which the belts 13 operate. A transversely extending, rod-like member 14 is mounted between the frame members 10, being held in position in any suitable manner, as by means of the cotter pins 15. The frame members 10 are provided with upwardly extending portions 16 having a narrow slot 17 and a wide slot 18 therein which join to form the shoulders 19.

Slidably mounted upon the rod 14 are the belt guides 20 which have pairs of ears 21 defining a groove 22 therein within which the belts 13 are adapted to lie. The members 20 are duplicates and each engages with a belt 13 in the same manner. The upper end portion 23 of each of the members 20 is provided with a threaded portion 24 into which the threaded end 25 of the adjusting member 26 extends. The adjusting member 26 is provided with a knurled head 27 and with an enlarged portion or flange 28 spaced therefrom to provide a groove 29 between the hub portion 30 on the head 27 and the flange 28. The reduced portion of the adjusting member 26 at the groove 29 fits in the slot 17 and the flange 28 fits in the slot 18. Thus the adjusting member 26 is rotatable relative to the upward extension 16 on the frame 10 but is not axially movable therein. As a result, the belt guide 20 will be moved along the rod 14 when the head 27 of the adjusting member 26 is rotated. Obviously each guide member 20 can be adjusted along the rod independently of the other guide member, and due to the construction of said guide members and the proximity of the same to the pulleys 12, the belts 13 can be properly guided as the same run onto the pulleys to make sure that the same will run straight after leaving said pulleys.

What we claim and desire to secure by Letters Patent is:

1. In combination with spaced frame members, parallel, spaced shafts on the frame members, a pulley on one of said shafts, a block slidably mounted on the other shaft having spaced ears for engaging a belt traveling over the pulley, a slotted bracket on one of the frame members, and an adjusting member, rotatably anchored and vertically movable in said bracket and having threaded engagement with said block.

2. In combination with a frame member, having a shouldered slot member, parallel shafts mounted on said frame member, a pulley on one of the shafts, a block slidable on the other shaft having spaced ears for engaging opposite edges of a belt traveling on said pulley, and an adjusting member having a slotted head rotatably anchored in the slotted member of said frame and having screw engagement with said block.

3. In a belt support of the character described, spaced frame members having guide-supporting portions, a pulley shaft rotatably supported by the frame members, a plurality of pulleys on the shaft, a guide shaft supported by the frame members, independent guide members slidable on the guide shaft for respective belts traveling on the several pulleys, and independent means rotatably anchored in said guide-supporting portions for moving the guide members on the guide shaft.

4. In a guide for a belt running over a pulley supported by a frame, a guide shaft supported by the frame, a guide block slidable on the shaft and provided with a groove for receiving the belt, a bracket fixed to the frame and provided with spaced ears producing a slot, a rotatable adjusting member removably mounted in the slot and provided with shoulders engaged with said ears for restraining the member against longitudinal movement, the adjusting member being screw-threadedly engaged with the guide block for shifting the same on the guide shaft.

In testimony whereof we affix our signatures.

EDWARD M. BRACKETT.
FRED M. BRACKETT.